United States Patent [19]

Morisawa

[11] Patent Number: 4,943,853
[45] Date of Patent: Jul. 24, 1990

[54] TV VIEWER

[75] Inventor: Tahei Morisawa, Tokyo, Japan

[73] Assignee: Asahi Kogaku Kogyo Kabushiki Kaisha, Tokyo, Japan

[21] Appl. No.: 210,552

[22] Filed: Jun. 23, 1988

[30] Foreign Application Priority Data

| Jun. 26, 1987 | [JP] | Japan | 62-159010 |
| Jul. 10, 1987 | [JP] | Japan | 62-172447 |
| Jul. 10, 1987 | [JP] | Japan | 62-172448 |
| Jul. 15, 1987 | [JP] | Japan | 62-176628 |
| Jul. 15, 1987 | [JP] | Japan | 62-176629 |

[51] Int. Cl.$^5$ .............................................. H04N 5/253
[52] U.S. Cl. ................................ 358/102; 353/26 A; 353/35; 353/DIG. 2; 358/74
[58] Field of Search .................... 358/102, 76; 353/35, 353/DIG. 2, 26 A

[56] References Cited

U.S. PATENT DOCUMENTS

| 4,043,652 | 8/1977 | Mickelson | 353/26 A |
| 4,656,524 | 4/1987 | Norris | 358/76 |
| 4,745,489 | 5/1988 | Kashiwagi | 353/26 A |

Primary Examiner—Howard W. Britton
Attorney, Agent, or Firm—Sandler, Greenblum & Bernstein

[57] ABSTRACT

A TV viewer having a light source and an image pick-up device is provided which is spaced from the light source at a predetermined distance, the viewer having a film holding plane and a slide holding plane which are spaced from one another along the optical axis direction of the image pick-up device, between the light source and the image pick-up device, a film feeding device for feeding the film to the film holding plane, and a slide feeding device for feeding at least one slide to the slide holding plane.

25 Claims, 16 Drawing Sheets

TV VIEWER

BACKGROUND OF THE INVENTION

1. Field of the Invention

The present invention relates to a TV (television) viewer which shows pictures of a slide, an elongated negative or positive film strip, or a print taken by a TV camera or a video camera or the like, using a TV monitor.

2. Description of Related Art

A conventional slide projector projects positive images of a slide onto a screen. The slide is a piece of developed reversal (positive) film in a frame.

However, in a slide projector, it is difficult to optically reverse a negative into a positive, and, accordingly, the negative film can be projected on a screen only as a negative image.

On the other hand, film which is usually used in a conventional camera is not reversal film for a slide, but is instead a negative film for a print. Therefore, it is necessary to prepare a slide in order to see the negative film pictures through a slide projector.

Furthermore, in order to project pictures onto a screen through this kind of slide projector, it is necessary to hang the screen from above and to darken a projecting room. These are troublesome operations.

Summary of the Invention

The primary object of the present invention is therefore to provide a TV viewer which can selectively show enlarged pictures of film or slide pictures, regardless of whether they are positive or negative.

A second object of the present invention is to provide a TV viewer in which, even when a film is replaced with a slide and vice versa after focus adjustment is completed, no readjustment of focus is necessary.

A third object of the present invention is to provide a TV viewer which can detect the leading and tail ends of film which is automatically fed to a predetermined imaging position in order to electrically control the feed position of the film.

A fourth object of the present invention is to provide a TV viewer which can selectively show enlarged print, film and slide pictures, regardless of whether they are positive or negative.

A fifth object of the present invention is to provide a TV viewer in which, when an exchange between film, a slide (or slides) and a print is effected after focus adjustment is completed, no focus readjustment is necessary.

To achieve the first object mentioned above, a TV viewer according to the present invention has a light source and an image pick-up device (i.e., an imaging device) which is opposed to and spaced from the light source at a predetermined distance, a film holding plane and a slide holding plane which are spaced from one another in the optical axis directions between the light source and the imaging device, a film feeding device which feeds the film to the film holding plane, and a slide feeding device which feeds the slide to the slide holding plane, wherein pictures of the film which are held in the film holding plane or pictures of the slide which are held in the slide holding plane are imaged by the imaging device to show them in a monitor TV.

To achieve the second object mentioned above, the TV viewer mentioned above additionally has an optical element which can be retractably inserted between the image pick-up device and the film and slide holding planes to make the optical distance between the film and the imaging device identical to the optical distance between the slide and the imaging device.

To achieve the third object mentioned above, a TV viewer according to the present invention includes a light source and an image pick-up device (imaging device) which is opposed to and spaced from the light source at a predetermined distance, a film holding plane between the light source and the imaging device, a film feeding device which feeds the film to the film holding plane, wherein the imaging device output images or pictures of the film which are held in the film holding plane, into a monitor TV, and a control unit which has detectors for detecting the leading and tail ends of the film which are fed by motor-driven rollers which are controlled by the control unit.

To achieve the fourth object of the invention, a TV viewer according to the present invention includes a print holding plane which holds a print, a light source for illuminating the print holding plane, a film holding plane and slide holding plane which are spaced from one another in the optical axis directions, between the light source and an imaging device, wherein said imaging device receives a light flux which is reflected by the print located on the print holding plane or which is reflected by the print holding plane in which no print is located and transmitted through the film or slide to output the image signals of the print, the film and the slide to the monitor TV.

To achieve the fifth object of the invention, in the TV viewer mentioned above, provision is made for to a focal length adjusting means for adjusting the focus of the image pick-up device, wherein the focal point of the image pick-up device coincides with the print on the print holding plane, the film in the film holding plane, or the slide in the slide holding plane.

BRIEF DESCRIPTION OF THE DRAWINGS

The invention will be described below in detail with reference to the accompanying drawings which show preferred embodiments of the invention, and in which.

DETAILED DESCRIPTION OF THE INVENTION

Figure 1:
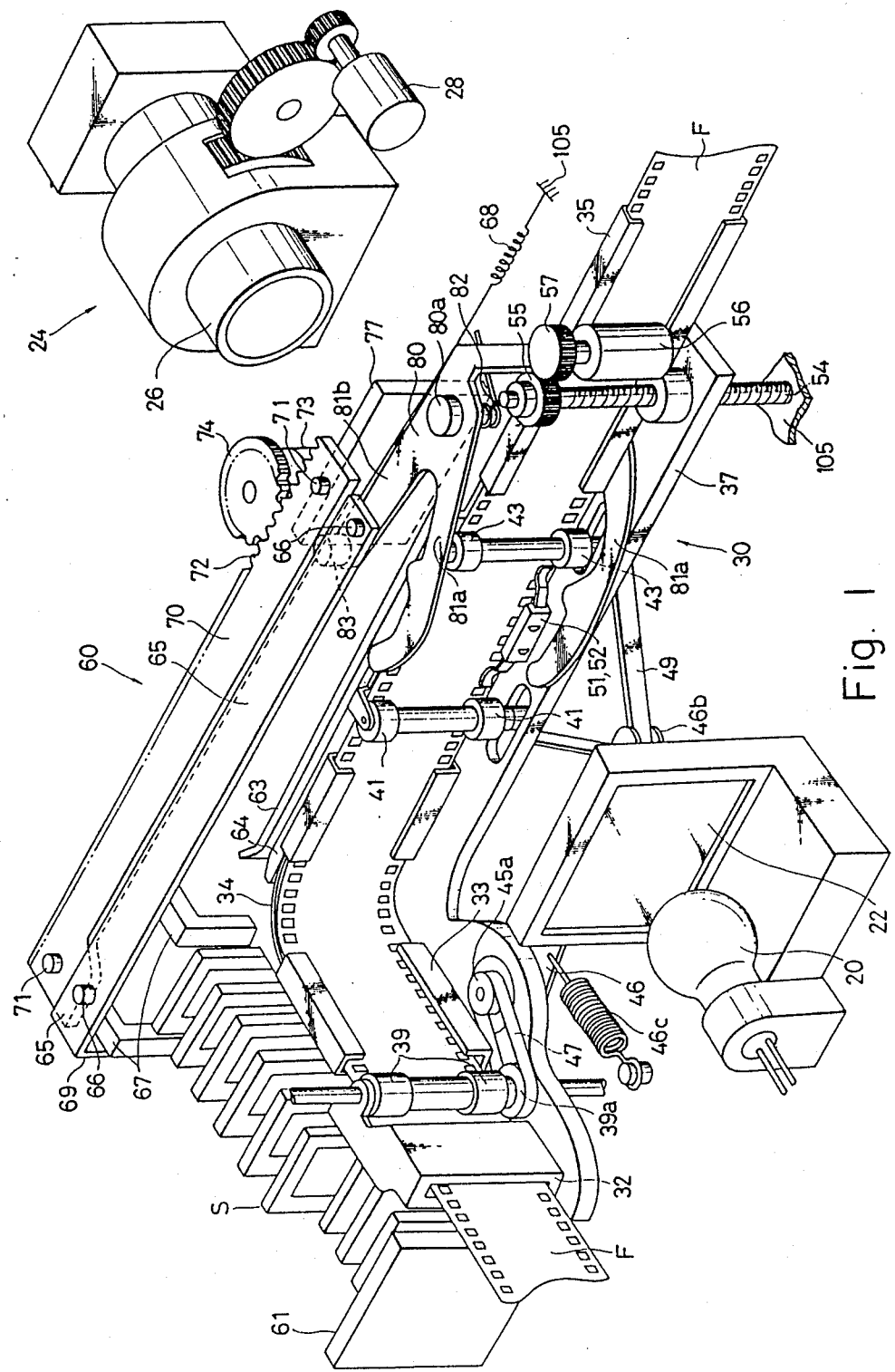
FIG. 1 is a perspective view showing the internal construction of a TV viewer according to one aspect of the invention.

The TV viewer of the invention has a light source 20 and an image pick-up device (an imaging device, such as a camera) 24 which is opposed to, and spaced from, the light source by a distance which is longer than the focal length of photographing lens 26 of the imaging device 24. Between the light source 20 and the imaging device 24 a white diffusion transmission plate 22 is provided which is located in the vicinity of the light source 20 and which lies in a plane perpendicular to the optical axis of the photographing lens 26. The imaging device 24 has an imaging element, such as a CCD (not shown) incorporated therein, on which an image or picture is formed. The imaging element can be rotated about the optical axis of the lens 26 by a drive unit 28 having a motor (not shown) and a reduction gear train (not shown). Namely, the imaging element can occupy any angular position. Note that the imaging device 24 has an imaging circuit, which is known per se, which electrically reverses a negative into a positive and vice versa.

Figure 2:
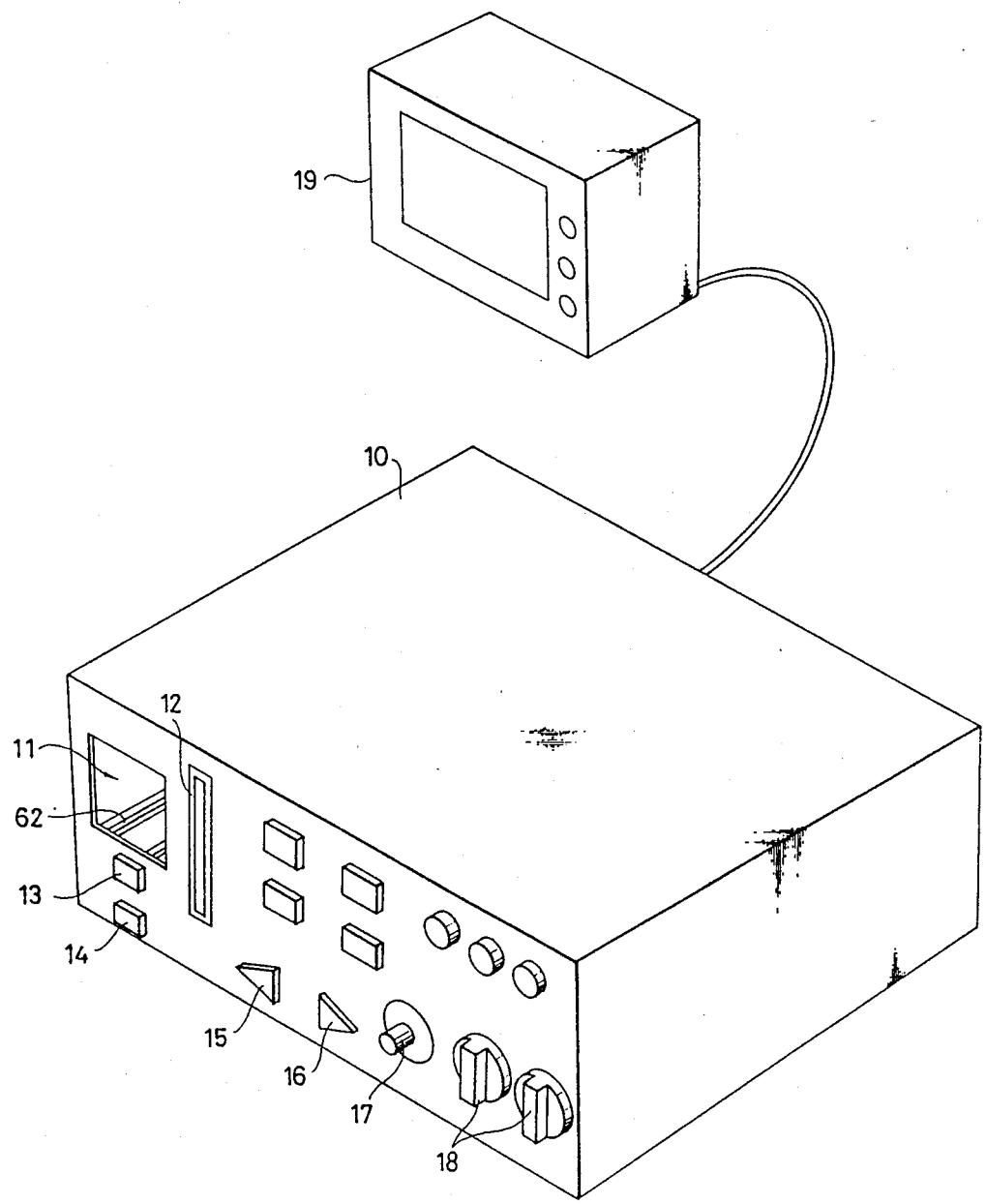
FIG. 2 is a perspective view showing the exterior appearance of the TV viewer shown in FIG. 1.

A film feeding device 30 and a slide feeding device 60 are provided between the diffusion transmission plate 22 and the imaging device 24. These components are incorporated in a casing (cabinet) 10, as shown in FIG. 2, in which numeral 11 designates an insertion opening of a slide case, 12 a film insertion opening, 13 an ejecting button, 14 a power switch, 15 a frame reversing button, 16 a frame forwarding button, 17 a frame adjusting handle, 18 levers for controlling the drive unit 28 to switch the vertical and horizontal positions of the imaging element, and 19 a monitor TV which shows pictures picked up by the imaging device 24 and which can be a television for a domestic use. These will be discussed in detail hereinafter.

The film feeding device 30 has a vertically elongated film insertion opening 32, and a film guide member having an introduction guide 33 which is connected to the film insertion opening 32 and which extends substantially parallel to with the optical axis, a holding guide 35 which extends substantially perpendicularly to the optical axis, and a curved guide 34 which smoothly connects guides 33 and 35 in a direction which is substantially normal to each other. Insertion opening 32 and guides 33, 34 and 35 are shaped so that film F is guided and held such that the plane of the film lies in a vertical plane, as shown in FIG. 1. The insertion opening 32 is fitted in the film insertion opening 12 of the casing 10 so as to move upwardly and downwardly. Guides 33 and 35 have upper and lower U-shaped guiding plate portions which surround upper and lower perforations of the film F. The holding guide 35 has an aperture 36 (FIG. 8) which corresponds to the size of a picture plane of the film and which has a center which is coaxial with to the optical axis of the imaging device 24. The plane that defines the aperture 36 and that is adjacent to the light source 20 forms an imaginary film holding plane.

Between aperture 36 and image pick-up device 24 a parallel flat glass plate 77 is arranged which lies in a plane perpendicular to the optical axis and which can be inserted in and retracted from the optical path (i.e., the optical axis) of the image pick-up device 24, so that when the film F is imaged (monitored), the flat glass plate 77 is located in the optical path to intersect the optical path at right angles.

Figure 3:
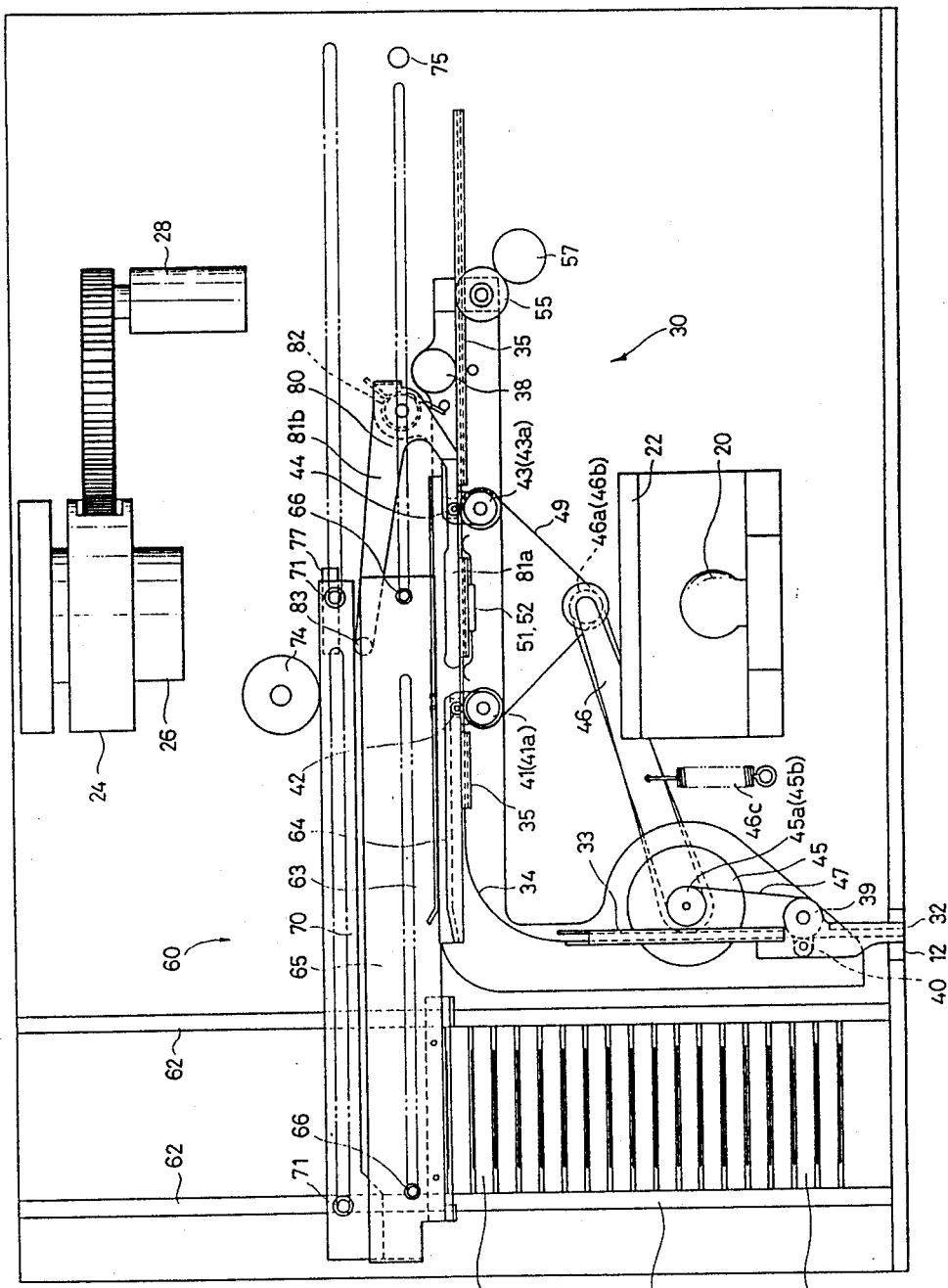
FIGS. 3 and 4 are plan views showing the internal construction of the TV viewer in FIG. 1, shown in different positions.

The curved guide 34 which smoothly connects the introduction guide 33, which is in turn connected to the insertion opening 32, to the holding guide 35, is elastically flexible. The holding guide 35 is supported on a supporting base 37 so as to move in a direction perpendicular to the optical axis. The fine movement of the holding guide 35 can be effected by a lateral framing motor 38 through a reduction gear device (not shown), as shown in FIG. 3.

Along the film passageway which is defined by the film guides 33, 34 and 35, driving rollers 39 and corresponding driven rollers 40, are provided along introduction guide 33, in the vicinity of the insertion opening 32, so that the perforations of film F are held by rollers 39 and 40. Driving rollers 41 and corresponding driven rollers 42, and driving rollers 43 and corresponding driven rollers 44 are provided on opposite sides of the aperture 36 and along the passage of film F. The rotational shafts of the driving rollers 39, 41 and 43 have pulleys 39a (FIG. 1), 41a and 43a (FIG. 8) secured thereto so as to rotate together with the respective rotational shafts.

On the supporting base 37 a film feeding motor 45 is provided which is located in the vicinity of driving rollers 39 and which has a drive shaft projecting upwardly and downwardly from the supporting base 37. The upper and lower projecting ends of the drive shaft of the film feeding motor 45 have pulleys 45a (FIGS. 1 and 3) and 45b (FIG. 8) secured thereto. A tensioning arm 46 is rotatably mounted to the base 37 about a shaft coaxial to the drive shaft of the film feeding motor 45. The tensioning arm 46 is provided, on its front end, with two pulleys 46a and 46b which are mounted thereto so as to rotate together.

A belt 47 is wound around the pulley 45a of the film feeding motor 45 and the pulley 39a of the driving rollers 39, in a horizontal plane. A belt 48 is wound around the pulley 45b and the pulley 46a, in a horizontal plane. A belt 49 is wound around the pulleys 41a and 43a of the driving rollers 41 and 43 and around the pulley 46b, so that the driving rollers 39, 41 and 43 can be simultaneously rotated in the same direction by the film feeding motor 45. The driving rollers 39, 41 and 43 and the associated driven rollers 40, 42 and 44 hold between them the film, along film perforations and accordingly, the film is fed along the film guides 33, 34 and 35. The tensioning arm 46 is continuously biased by a tensile spring 46c which is connected to the tensioning arm 46 at one end and to the base 37 at the opposite end, so that the belt 49 is tensed.

Figure 10:
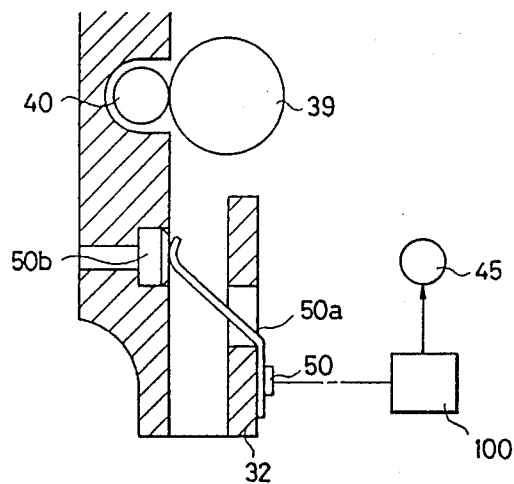
FIGS. 10 and 11 are longitudinal sectional views of a film insertion detecting switch shown in different positions.
Figure 11:
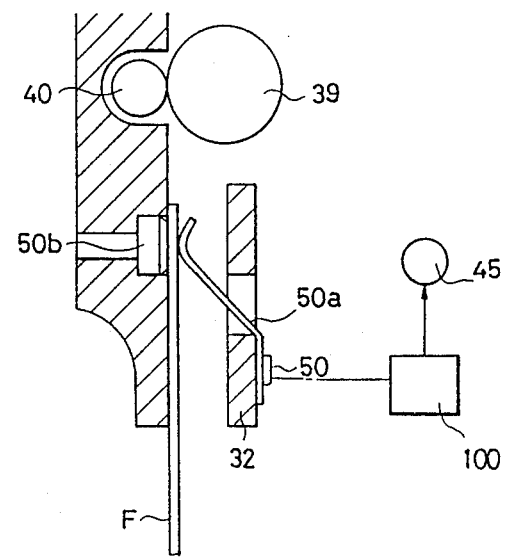

A film insertion detecting switch 50 in the film insertion opening 32 is provided and has a movable contact 50a and a stationary contact 50b which is opposed to the movable contact 50a and which is normally brought into contact with the movable contact 50a, as shown in FIGS. 10 and 11. The film F passes between the opposed contacts 50a and 50b. The film insertion detecting switch 50 is made ON and OFF, dependent upon whether the film passes through the passageway between the movable contact 50a and the stationary contact 50b.

Figure 13:
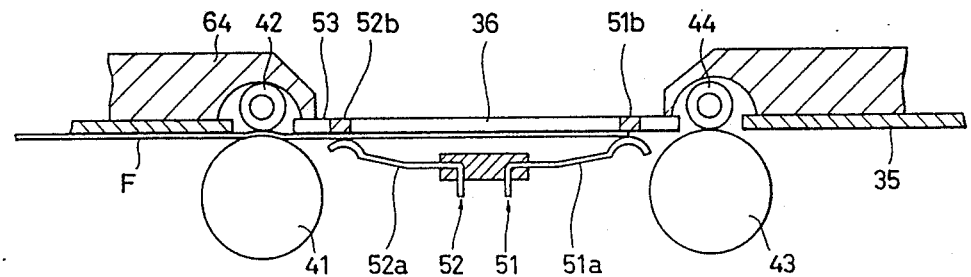
Figure 14:
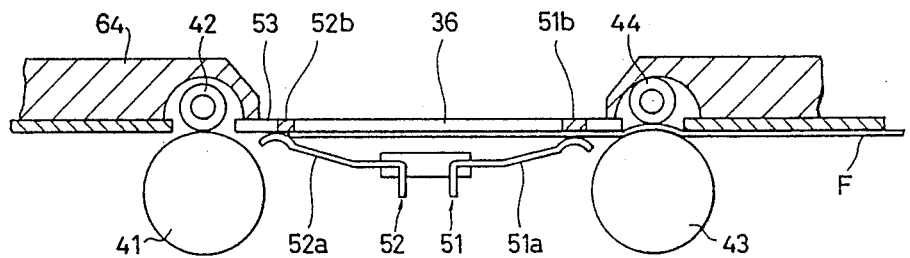

As can be seen in FIGS. 13 and 14, a leading end detecting switch (detector) 51 for detecting the leading end of the film F and a tail end detecting switch (detector) 52 for detecting the tail end of the film F are provided below and on the right and left sides of the aperture 36. The leading end detecting switch 51 has a movable contact 51a and a stationary contact 51b on opposite sides of the film F. The tail end detecting switch 52 has a movable contact 52a and a stationary contact 52b on opposite sides of the film F. The leading end detecting switch 51 and the tail end detecting switch 52 are made ON and OFF whether the film F passes through the passage between the movable contact 51a and the stationary contact 51b and between the movable contact 52a and the stationary contact 52b, respectively, similarly to the film insertion detecting switch 50. It should be appreciated that the movable contacts 50a, 51a and 52a and the stationary contacts 50b, 51b and 52b are formed and placed so that the contacts do not enter the perforations of the film F.

The diffusion transmission plate 22 and the photographing lens 26 are opposed in the optical axis direction, so that the aperture 36 is located therebetween. The film holding plane of the aperture 36 that is adjacent to the diffusion transmission plate 22 is located close to the photographing lens 26 from the focal point of the photographing lens 26 by a deviation substantially equal to the thickness of the film F, so that the picture plane of the film F is located at a focal point of the photographing lens 26 when the parallel flat glass plate 77 is inserted in the optical path thereof. The plane that is defined by the aperture 36 and that is adjacent to the imaging device 24 forms an imaginary slide holding plane in which a slide S is held, which slide will be described hereinafter. The size of the diffusion transmission plate 22 is such that when the film F in the aperture 36 is imaged by the imaging device 24, the light of the image is wholly uniform even after framing is effected.

The supporting base 37 is screw-engaged by a threaded shaft 54 which is rotatably screwed in a body 105 (FIGS. 1). The threaded shaft 54 is provided, on its front (upper) end, with a pinion 55 secured thereto which is in mesh with a pinion 57 of a longitudinal framing motor 56 provided on body 105. As a result, when the motor 56 rotates, the threaded shaft 54 is rotated through the pinions 57 and 55 to move the supporting base 37 up and down along the threaded shaft 54. The upward and downward movement of the base 37 is guided by a plurality of guide pipes (not shown) provided on the body which are maintained in a parallel arrangement.

The film feeding device 30 operates as follows.

When the film F is inserted in the insertion opening 32 and enters the passage between the movable contact 50a and the stationary contact 50b to separate them from one another (FIG. 11), the film insertion detecting switch 50 which is electrically connected to a control unit 100 (FIGS. 10 and 11) is turns OFF to start the film feeding motor 45 which is connected to the control unit 100. The commencement of rotation of the film feeding motor 45 causes the driving rollers 39, 41 and 43 to be rotated through the belt transmission mechanism mentioned above, so that the film F which is held between and by the driving rollers 39 and the associated driven rollers 40 is fed along the introduction guide 33 and the curved guide 34.

When the leading end of the film F past the tail end detecting switch 52 reaches the leading end detecting switch 51 which is connected to the control unit 100 (FIG. 12), the movable contact 51a which has been in contact with the stationary contact 51b is separated therefrom (FIG. 13) by the leading end of the film F, and the film feeding motor 45 is stopped. When the film feeding motor 45 stops, the first frame of the film F is aligned in the aperture 36. At this moment, the light source 20 is turned ON to show the pictures of film F in monitor TV 19.

After that, the frame feeding motor 45 rotates in the forward direction to feed the film F by one frame every time the frame forwarding button 16 is pushed. To the contrary, the frame feeding motor 45 moves the film F back by one frame every time the frame reversing button 15 is pushed. The control of rotation of the film feeding motor 45 can be easily effected, for example, in accordance with the peripheral length of the driving rollers 39, 41 and 43. Alternatively, it is also possible to control the rotation of the film feeding motor 45 by optically detecting separation lines between the frames of film F.

During the movement of frames of film, the image signals are not fed to the monitor TV 19 from the image pickup device 24, since the pictures tend to flicker. However, it is possible to continue feeding the image signals from the image pickup device 24 to the monitor TV in order to carry out a fine feed (adjustment) of the film while seeing the pictures shown by the monitor TV.

When the tail end of the film F passes the tail end detecting switch 52 which is electrically connected to the control unit 100, the latter is turned ON, namely, the movable contact 52a comes into contact with the stationary contact 52b because of the absence of film therebetween, as shown in FIG. 14, so that the film feeding motor 45 is stopped in accordance with a stop signal from the control unit 100.

When the film F is reversed after completion of the image pickup, the ejecting button 13 is pushed, so that the light source 20 is turned OFF and the TV monitor is also turned; made OFF. The film feeding motor 45 is reversed to discharge the film F from the film insertion opening 32 until the film insertion detecting switch 50 is turned ON.

The detection of the film insertion, detection of leading end of the film, the detection of tail end of the film, and control of the film feeding motor 45 can be effected by the control unit 100, as mentioned before.

The following discussion will be directed to the operation of the slide feeding device 60.

The slide feeding device 60 has a slide case 61 in which a desired number of slides S can be stored as they stand in parallel at a predetermined pitch. The slide case 61 is inserted in the slide case insertion opening 11 which is located outside from the film insertion opening 32. The slide case 61 is guided by and along guide rails 62, 62 which extend in parallel with the optical axis of the image pick-up device 24. The slide case 61 can be moved along the guide rails 62 by a case feeding mechanism (not shown).

Figure 15:
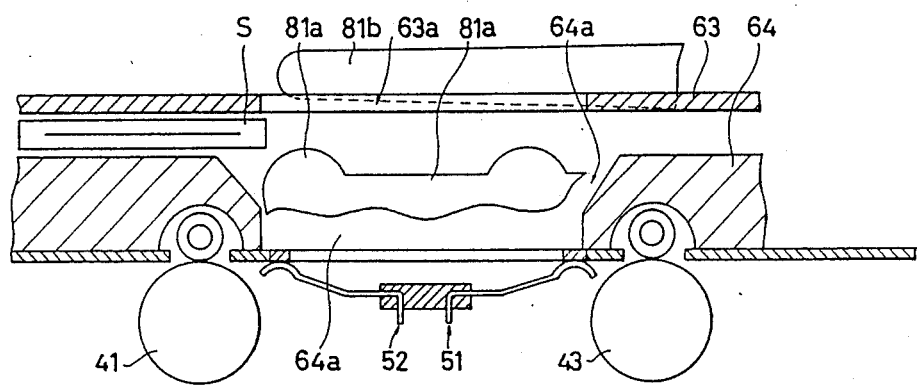
FIGS. 15, 16 and 17 are cross sectional views of a mechanism for loading and ejecting a slide, shown in different positions.
Figure 16:
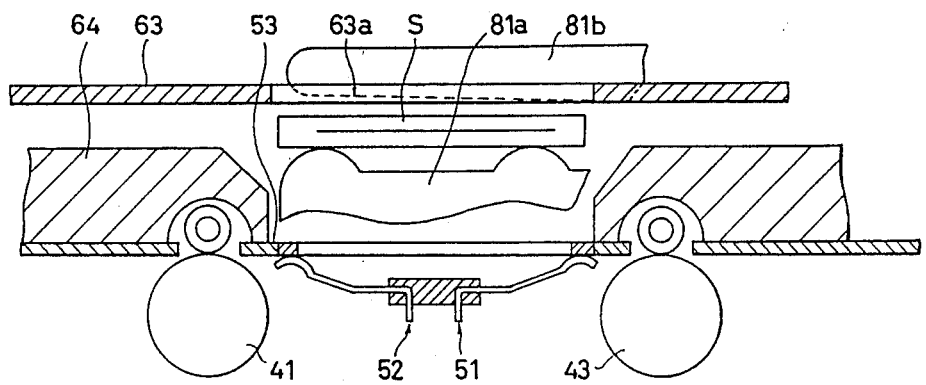
Figure 17:
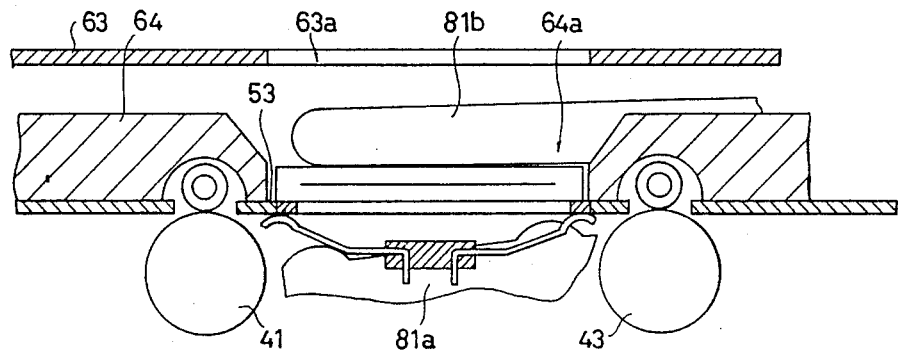
Figure 18:
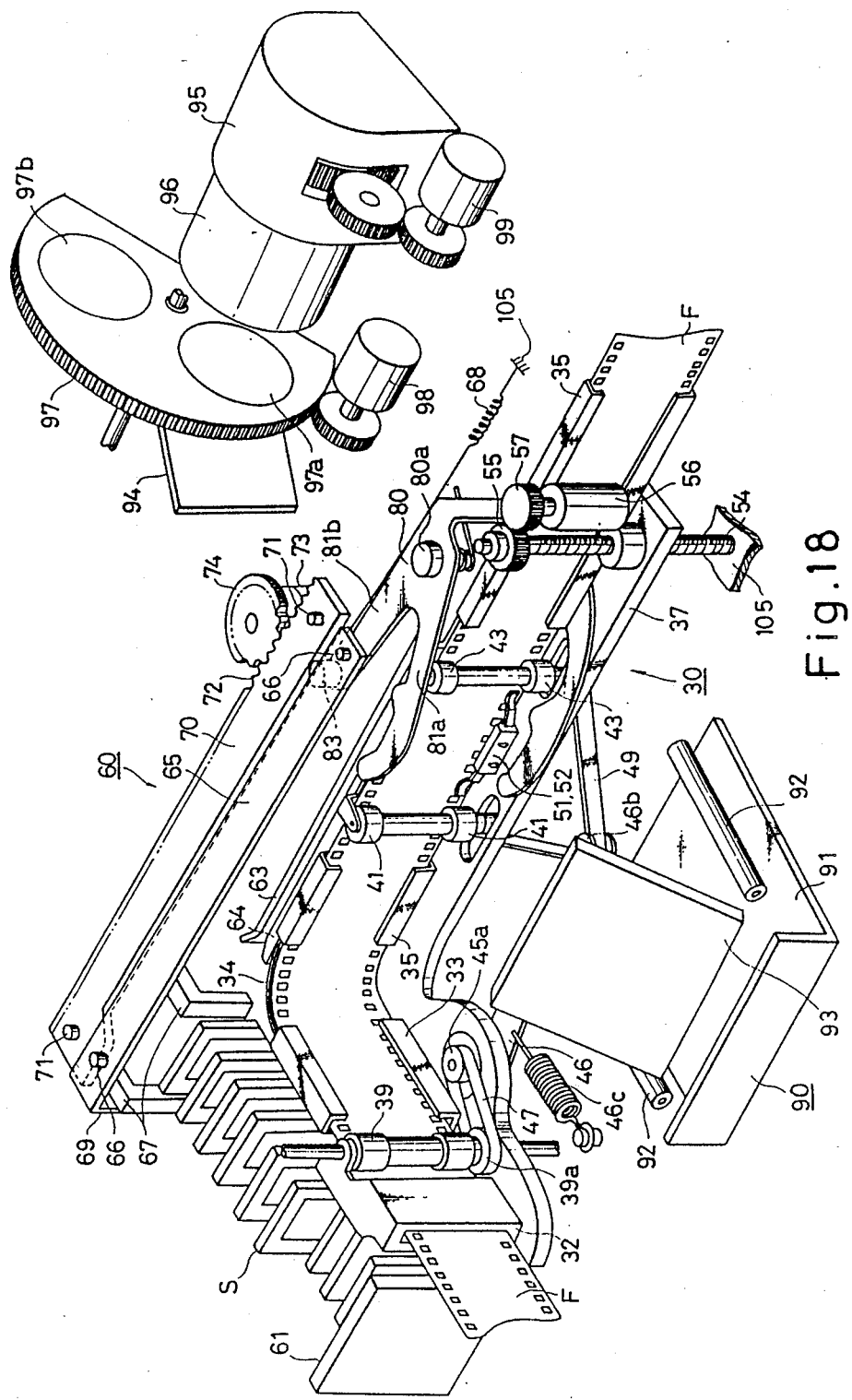
FIG. 18 is a perspective view showing an internal construction of a TV viewer according to another aspect of the invention.

On the side of the holding guide 35 adjacent to the photographing lens 26, slide guide plates 63 and 64 are provided which extend in a direction perpendicular to the optical axis. The slide guide plates 63 and 64 are provided, on their portions oppositely disposed with respect to the aperture 36, with windows 63a and 64a which are larger than the slide S (FIGS. 15 to 17).

Above slide guide plates 63 and 64, a first and second sliding plates 65 and 70 are provided which extend parallel to the slide guide plates 63 and 64. The sliding plates 63 and 64 are provided, on their opposite ends, with guide pins 66, 66 and 71, 71, respectively. The casing 10 has two corresponding elongated holes (not shown) which extend perpendicularly to the optical axis and in which the guide pins 66, 66 and 71, 71 are fitted, respectively, so that the first and second sliding plates 65 and 70 are slidable in a direction perpendicular to the optical axis.

Holding arms 67 are mounted to the left lower surface of the first sliding plate 65 (FIG. 1) to hold the right and left sides of the slides S which stands in the slide case 61, between the holding arms 67. The first sliding plate 65 is continuously biased by a tensile spring 68 which is connected to the body 105 and the right end of the first sliding plate 65, in a rightward direction, as viewed in FIG. 1.

The second sliding plate 70 is provided, on its rear end edge (adjacent to the photographing lens 26), with a rack 72 which is engaged by a pinion 74 of a slide feeding motor 73 provided on the supporting base 37.

Figure 4:
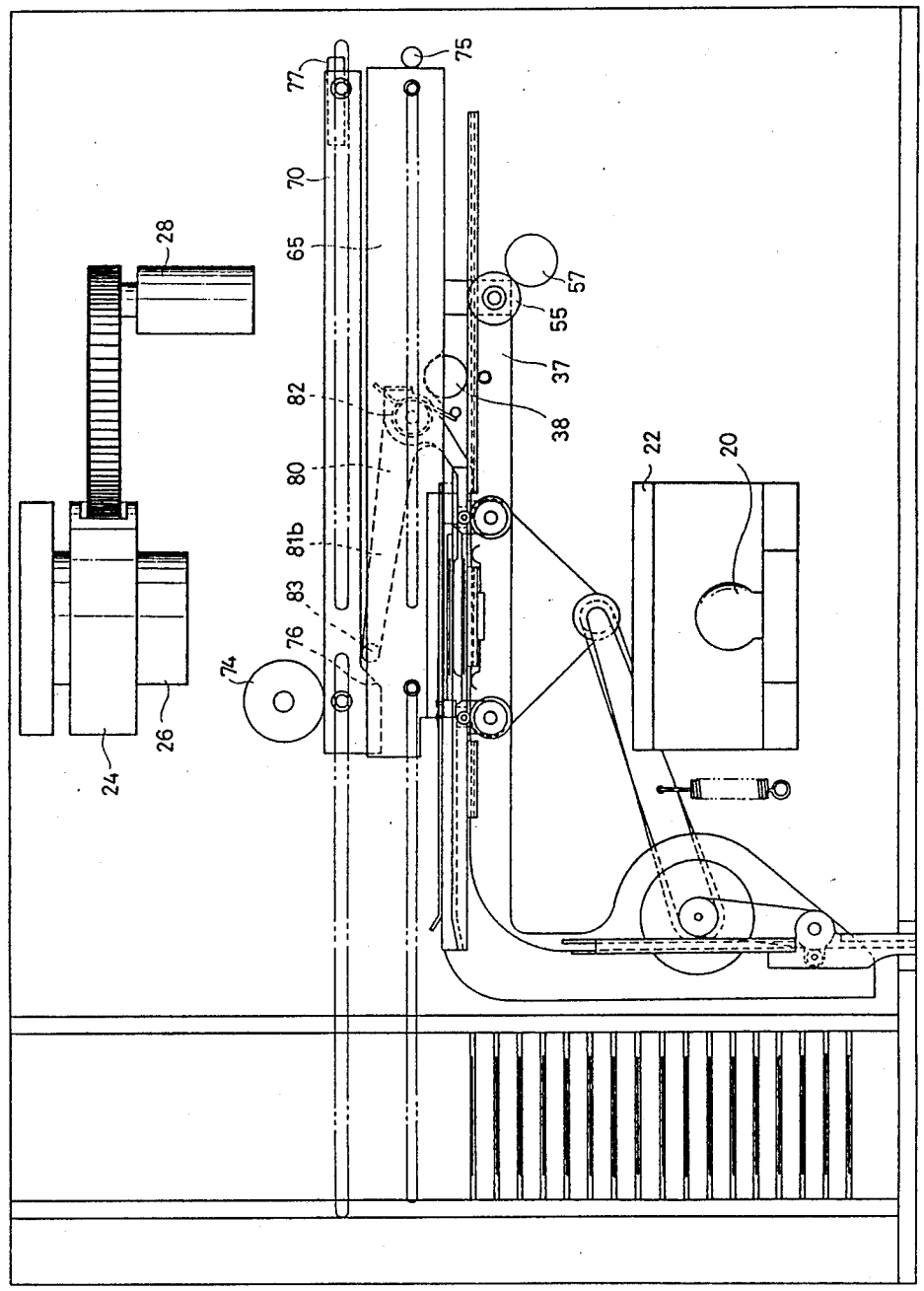
Figure 5:
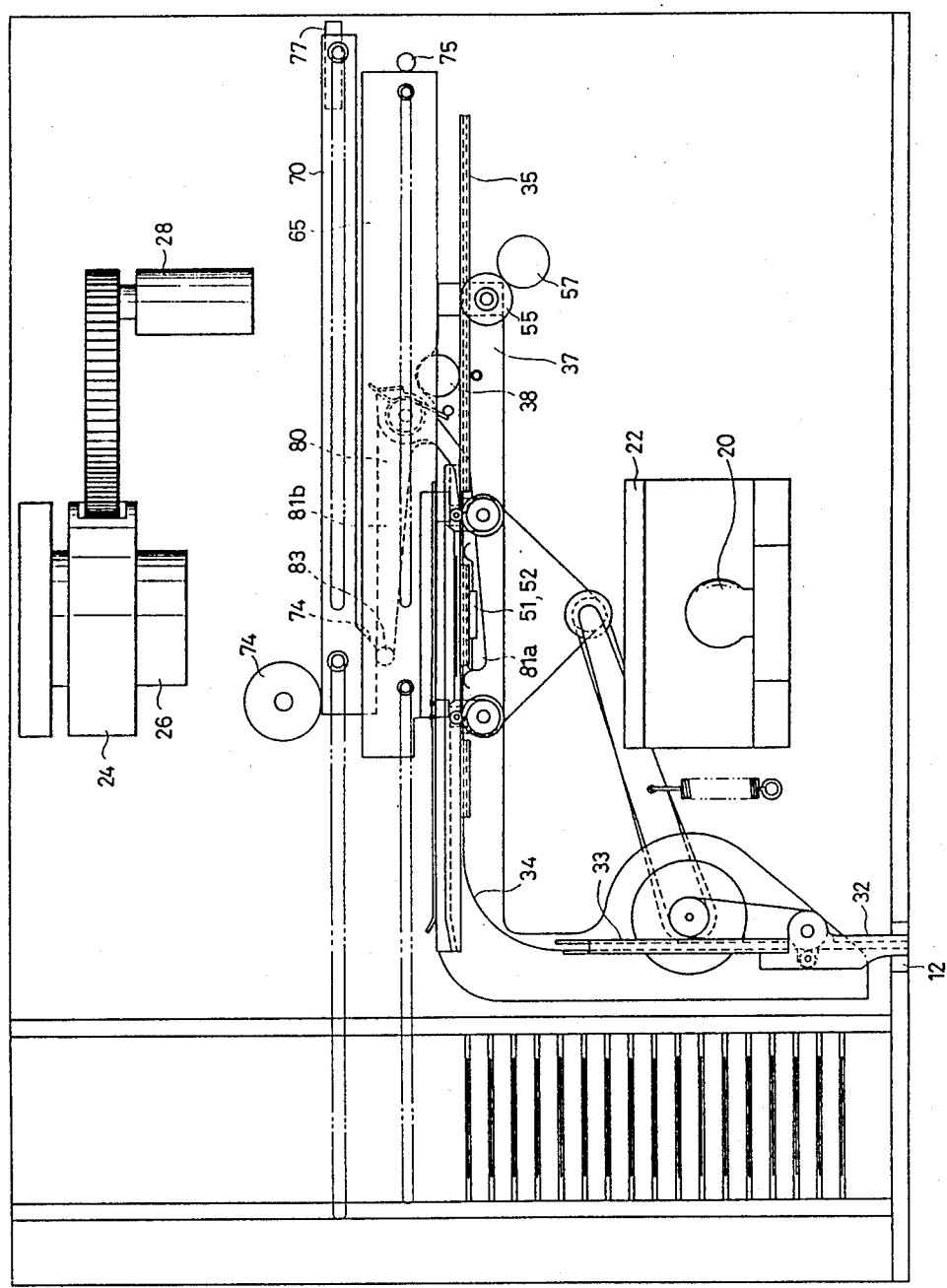
FIGS. 5 and 6 are plan views showing the internal construction of a TV viewer shown in FIG. 1, but shown in positions in which framing (adjustment) in the right hand and left hand directions is effected, respectively.

The first sliding plate 65 has at its left end a downwardly bent portion 69 which abuts the left end of the second sliding plate 70 (FIGS. 4 and 5). Accordingly, when the slide feeding motor 73 rotates, the second sliding plate 70 moves rightwardly, so that the first sliding plate 65 is also moved in the same direction by the tensile spring 68 until the right end of the first sliding plate 65 comes into abutment with a stop pin 75 provided on the body. The movement of the first sliding plate 65 causes the slide S which is held by the slide holding arms 67 to move between the slide guide plates 63 and 64 which are spaced from one another and to come to a position in which the slide S is aligned with the windows 63a and 64a.

On the right side of the windows 63a and 64a a generally U-shaped slide ejecting lever 80 is provided which has upper and lower lever arms to hold the upper and lower portions of each slide S. The slide ejecting lever 80 is rotatably supported on and by a vertical shaft 80a which is provided on the supporting base 37. The upper and lower lever arms of the slide ejecting lever 80 are spaced from one another at a distance slightly larger than the width of the film F, and have bifurcated portions 81a and 81b. The slide S can enter the bifurcated portions 81a and 81b, so that the peripheral edges of the slide S come into contact with the bifurcated portions. The ejecting lever 80 is biased by a torsion spring 82 wound around the vertical shaft 80a in an ejection direction in which the lever tends to rotate in a clockwise direction when, as viewed from above.

The second sliding plate 70 continues moving rightwardly after the first sliding plate 65 stops moving, so that a cam surface 76 of the second sliding plate 70 pushes a pin 83 of the slide ejecting lever 80 to rotate the latter in the counterclockwise direction. The rotation of the slide ejecting lever 80 causes the lever arm 81b (bifurcated portion) to come into contact with the slide S in order to disengage the slide S from the slide supporting arms 67, so that the slide S comes into contact with the aperture frame which defines the imaginary slide holding plane 53. This is shown in FIGS. 15 to 17.

The optical distance of the slide S which, lies in the imaginary slide holding plane 53, from the photographing lens 26, is different from the optical distance of the film F which lies in the imaginary film holding plane of the aperture 36, from the photographing lens 26. To make the two optical distances identical to each other, the parallel glass plate 77 (FIGS. 1 and 3) which lies in a plane perpendicular to the optical axis is attached to the second sliding plate 70, so that the glass plate 77 is brought into the optical path between the photographing lens 26 and the aperture 36 when the second sliding plate 70 is located in the initial position, and is retracted from the optical path when the second sliding plate 70 moves rightwardly into a loading position in which the slide S is placed into the slide holding plane 53. With this arrangement, the optical distance of the slide S in the slide holding plane 53, from the photographing lens 26, is equal to that of the film F in the aperture 36, so that the focus of the photographing lens 26 is coincident with the slide S and the film F when pictures of the slide and the film F are taken, respectively.

Figure 12:
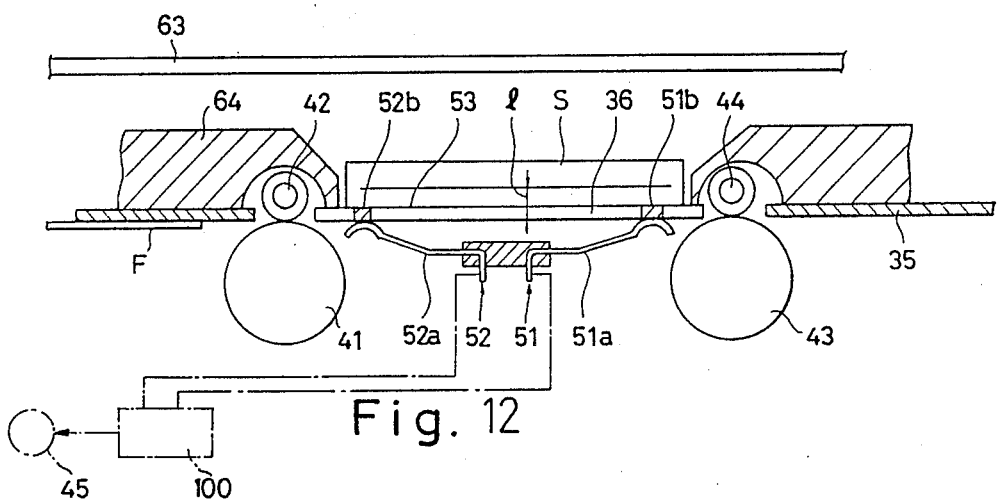
FIGS. 12, 13 and 14 are cross sectional views of a switch unit for detecting the leading and tail ends of the film, used in the present invention, shown in different positions.

The thickness d of the glass plate 77 is given by the following equation:

$$d = ln/(n-1)$$

wherein l represents the distance between the film plane and the slide plane shown in FIG. 12, and n represents the refractive index of the glass plate 77.

The operation of the slide feeding device 60 will be explained below in detail.

First, the slide case 61 which houses therein the slides S is inserted in the slide case insertion opening 11 and the frame forwarding button 16 is pushed to rotate the slide feeding motor 73. As a result, the first and second sliding plates 65 and 77 move rightwardly in order load one slide S into the slide holding plane 53, so that the light source 20 lights to show the pictures of the slide S in the monitor TV 19.

When the slide S is returned to its initial position, the frame reversing button 15 is pushed, so that the slide feeding motor 73 is reversed to move the second sliding plate 70 in the left hand direction. The second sliding plate 70 comes into engagement with the first sliding plate 65 along its path of movement in order to move together with the first sliding plate 65 into the initial position. During the movement of sliding plates 65 and 70, cam surface 76 is disengaged from pin 83 at the initial stage of the second sliding plate 70. As a result, the slide ejecting lever 80 rotates in a clockwise direction with the help of the torsion spring 82, so that the lever arm (bifurcated portion) 81a causes the slide S in the slide holding plane 53 to move to the slide holding arms 67 to be held thereby. Consequently, the slide S is returned into the slide case 61 by the first sliding plate 65. Preferably, when no slide S is in the slide holding plane 53, no image is fed from the image pick-up device 24 to the monitor TV 19.

After that, when the frame forwarding button 16 is pushed, the slide case 61 is moved forward by a distance corresponding to one slide of the case feeding mechanism (not shown), so that a subsequent slide S can be held by the slide holding arms 67. Then, the slide feeding motor 73 rotates to move the slide S to the slide holding plane 53.

The framing operation of the film F and the slide S will be discussed below.

Figure 8:
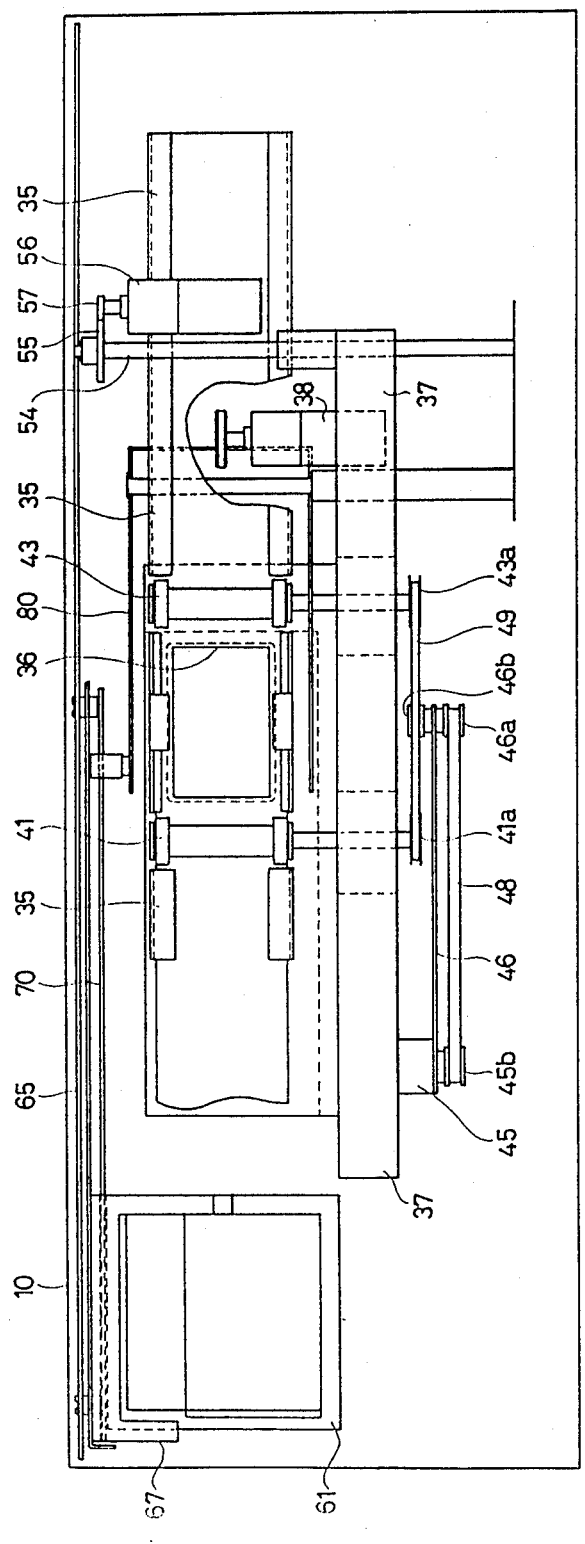
FIGS. 8 and 9 are front elevational views showing the internal construction of the TV viewer shown in FIG. 1, but shown in positions in which framing (adjustment) in upward and downward directions is effected, respectively.
Figure 9:
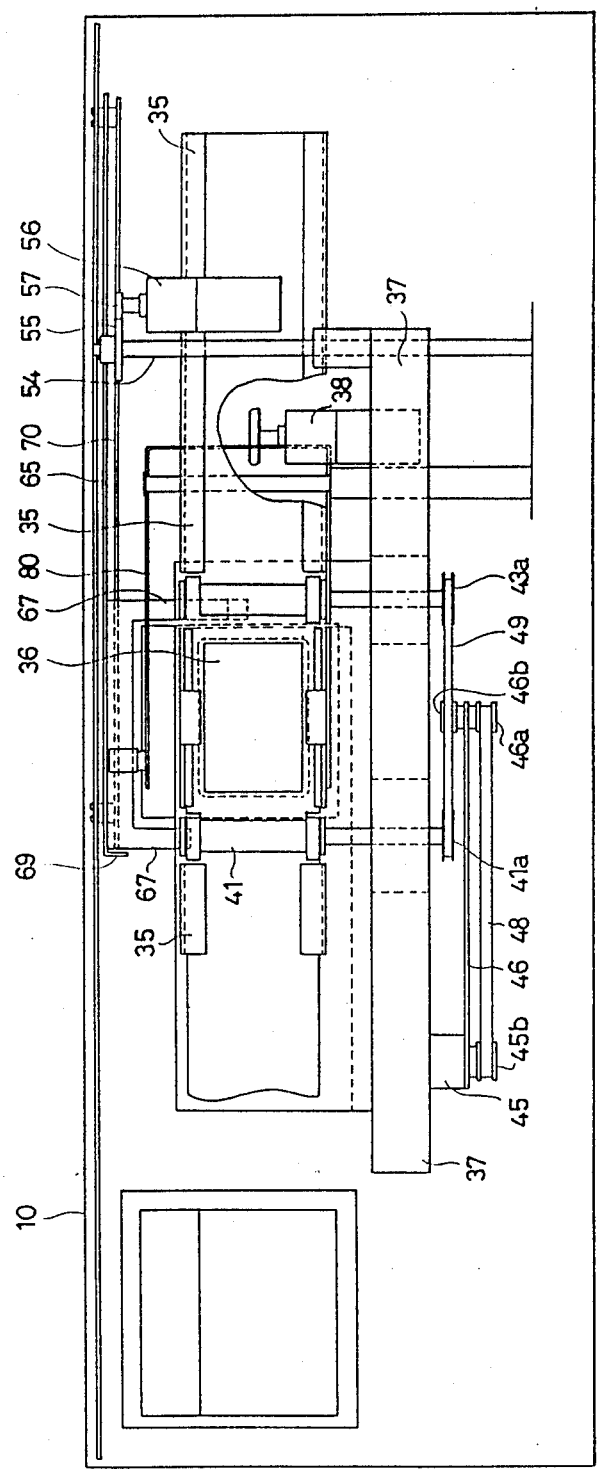

Framing in the vertical directions (upward and downward directions) is effected by the longitudinal (vertical) framing motor 56 which rotates the threaded shaft 54 to move the holding guide 35 up and down together with supporting base 37. This is shown in FIGS. 8 and 9.

Figure 6:
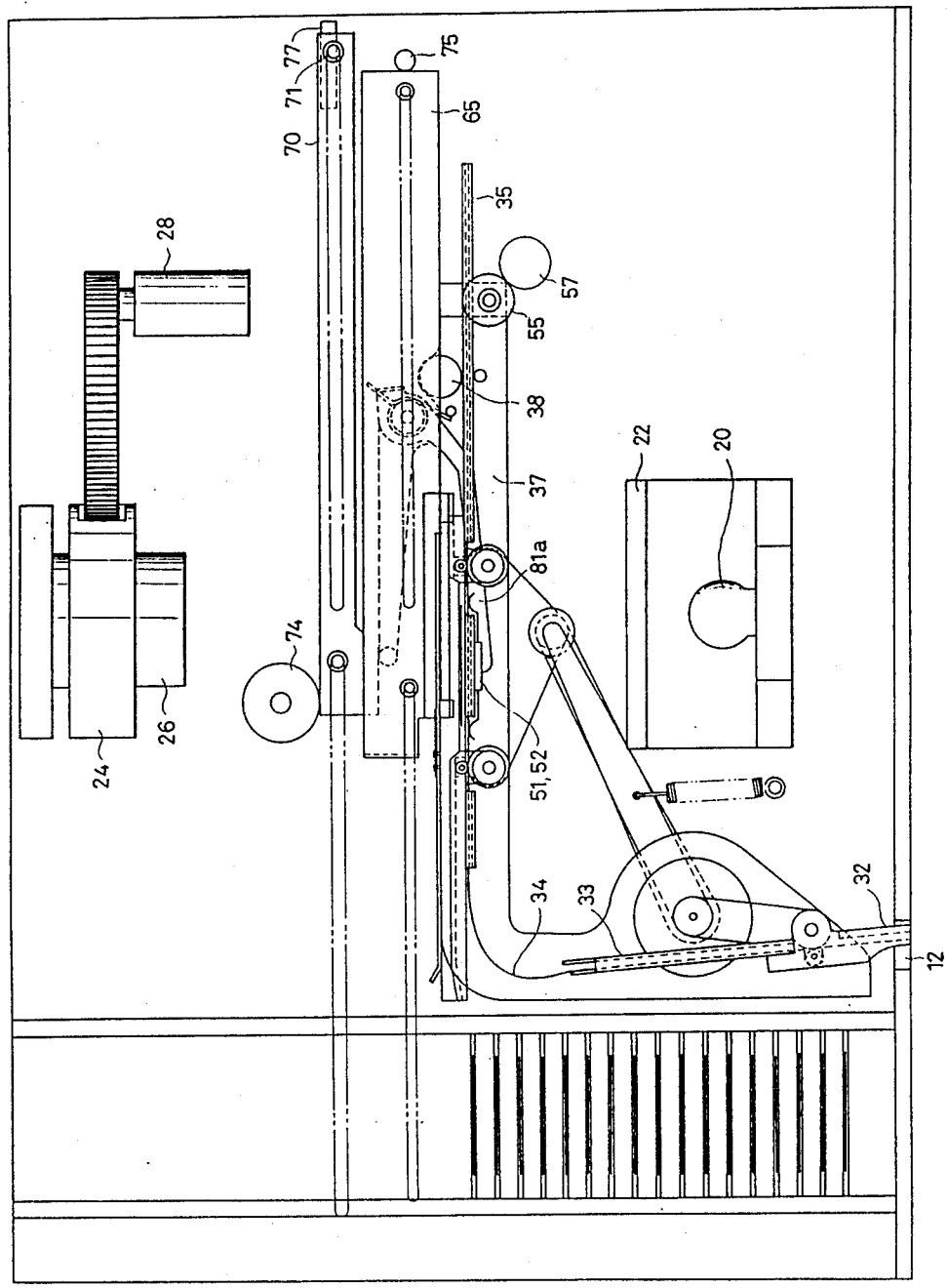
Figure 7:
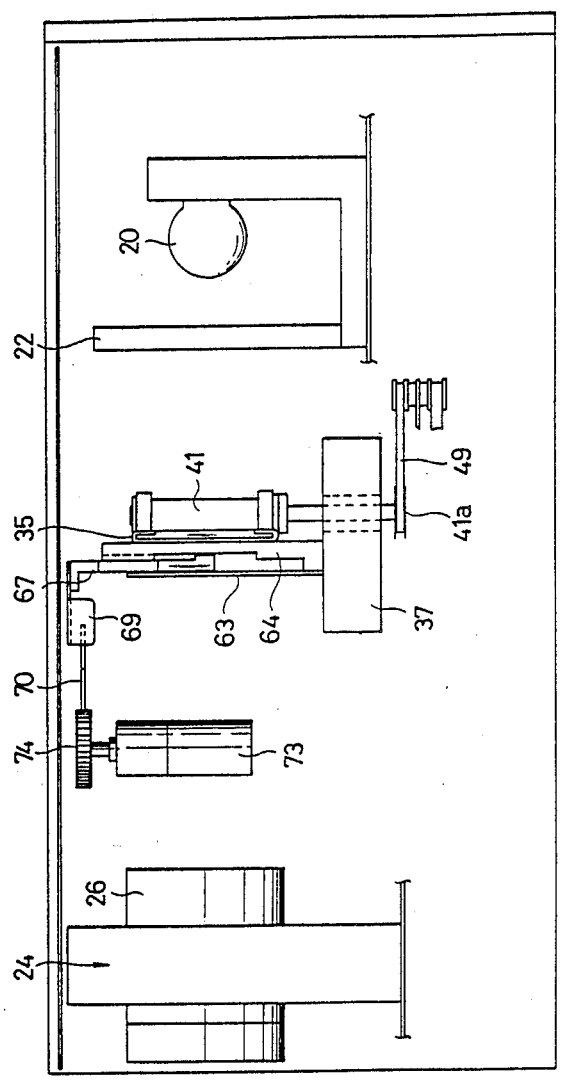
FIG. 7 is a side elevational view showing a main part of the internal construction of the TV viewer shown in FIG. 1.

Framing in the lateral directions (right and left hand directions) is effected by the lateral framing motor 38 which moves the holding guide 35 in right and left hand directions i.e., in (lateral directions). In lateral framing, the introduction guide 33 rotates about the insertion opening 32, so that the curved guide 34 is bent in accordance with rotational movement of the introduction guide 34, as can be seen in FIGS. 5 and 6.

The framing operations can be effected by the single framing adjusting knob 17. During framing operations in the upward and downward directions, as shown in FIGS. 8 and 9, the slide ejecting lever 80 does not move in any direction.

In the illustrated embodiments, the pictures of the positive film, the negative film, and the slide can be shown in the monitor TV 19. Namely, the film or the slide can be automatically and easily loaded by the feeding mechanisms 30 and 60, respectively. Furthermore, the framing operations can be advantageously effected by the single adjusting knob 17, while watching the monitor TV 19.

In case of the film F being used, since the leading and tail ends of the film F can be detected by the respective leading end and tail end detecting switches 51 and 52, the frame forwarding and reversing operations can be automatically effected. It is possible to provide the leading end detecting switch 51 and the tail end detecting switch 52 above and/or below the aperture 36.

In the above-mentioned embodiments, it has been supposed that the film used is a cut film having six frames which are usually treated in common DPE stores. Alternatively, it is also possible to use a long film which is not cut. The film ejection mechanism 30 has a discharging opening which can be provided on the front end of the holding guide 35, so that the film F can be discharged through the discharge opening. If a zoom lens is used as the photographing lens 26, a close-up photograph.

In the illustrated embodiment, although the imaginary slide holding plane 53 is defined on the side of the aperture frame that is closer to the image pick-up device 24, it is also possible to define the imaginary film holding plane 36 on the side of the aperture frame that is closer to the image pick-up device 24. Also, although the parallel glass plate 77 which serves as an optical element for making the optical path distance of the slide from the image pick-up device identical to that of the film is attached to the second sliding plate 70 of the slide feeding mechanism 60, it is possible to provide an actuator which is connected to the glass plate 77 to move the same into the optical axis.

According to another aspect of the present invention as shown in FIGS. 18 to 21, the pictures of the film, slide and print can be selectively imaged.

In FIGS. 18 to 21, elements corresponding to those shown in FIGS. 1 to 17 are designated by the same reference numerals.

Figure 19:
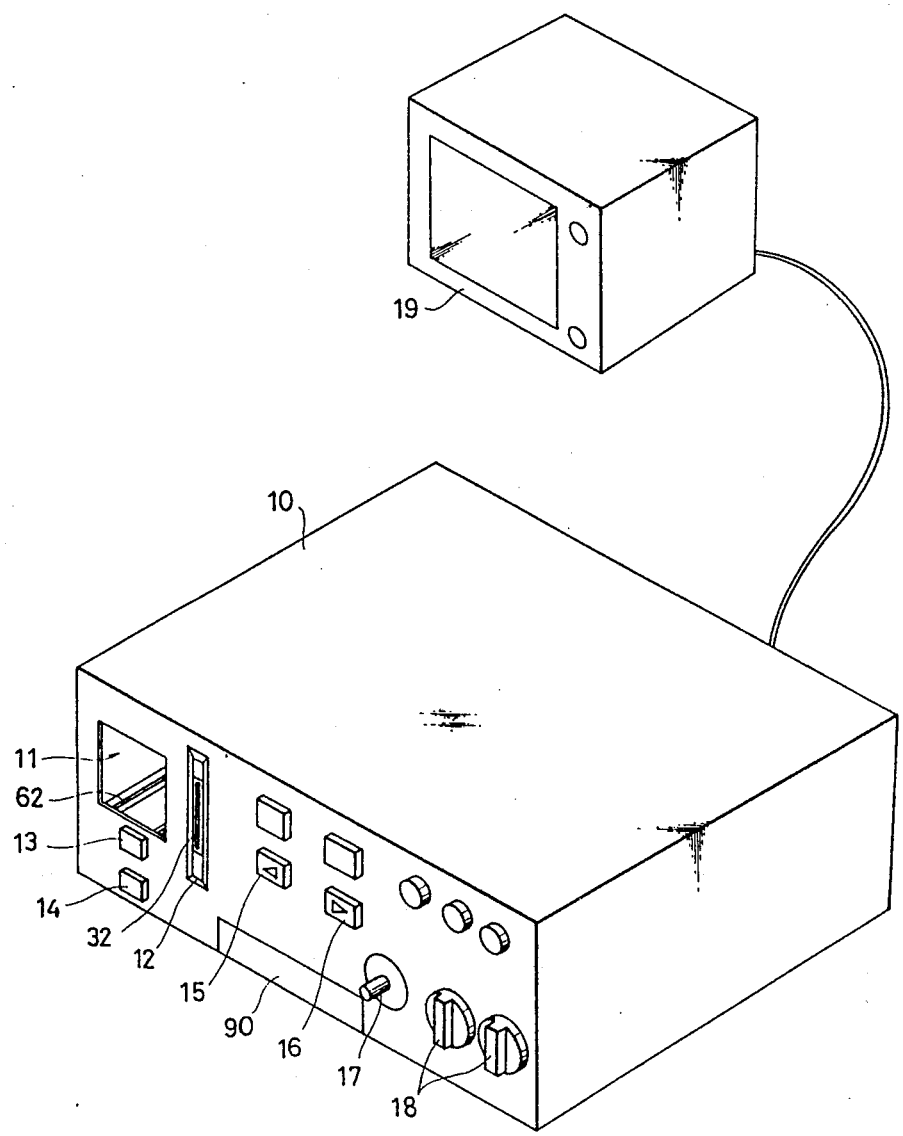
FIG. 19 is a perspective view showing the exterior appearance of the TV viewer shown in FIG. 18.
Figure 20:
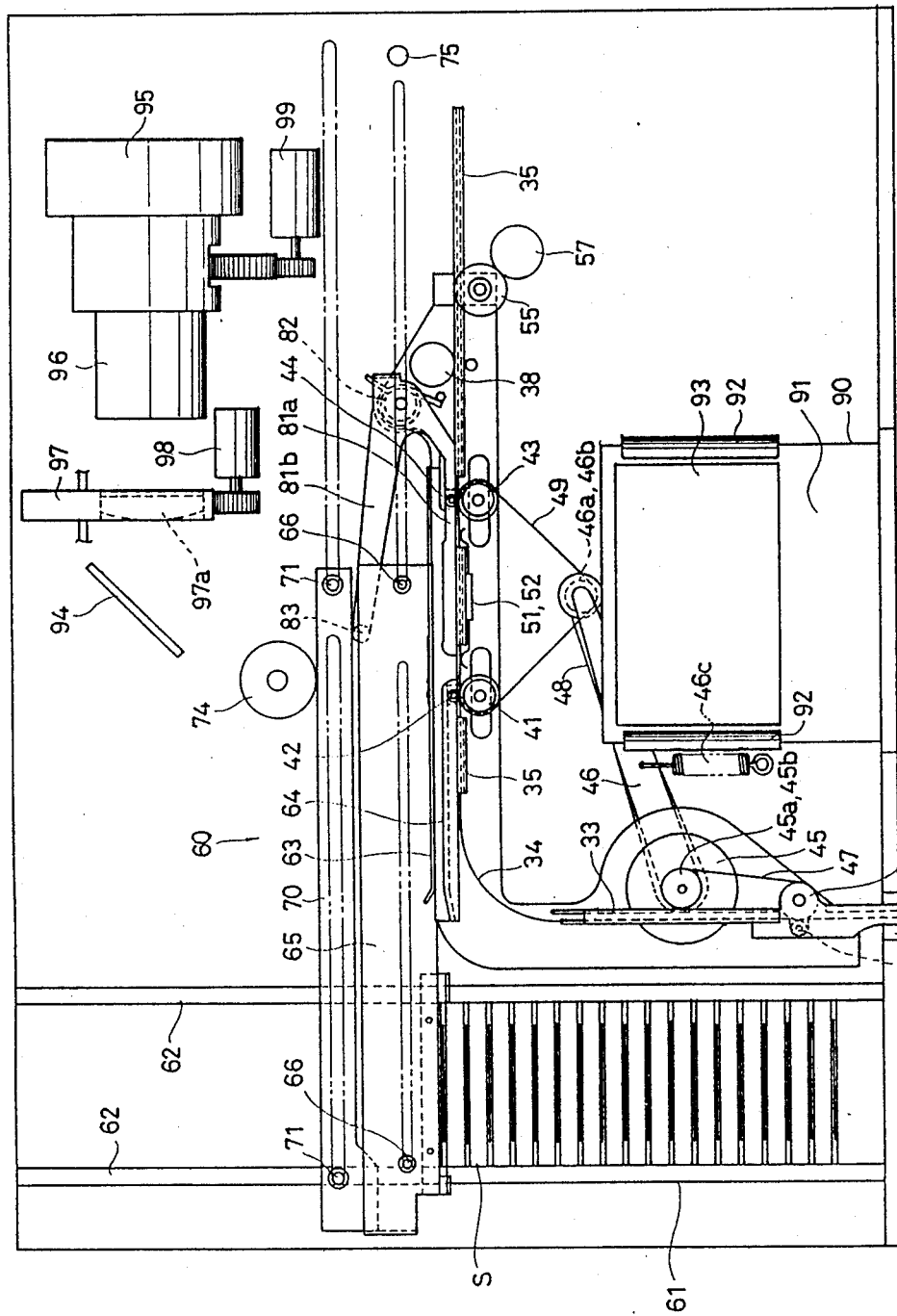
FIG. 20 is a plan view showing the internal construction of the TV viewer shown in FIG. 18; and, FIG. 21 is a side elevational view showing a main part of the internal construction of the TV viewer shown in FIG. 18.
Figure 21:
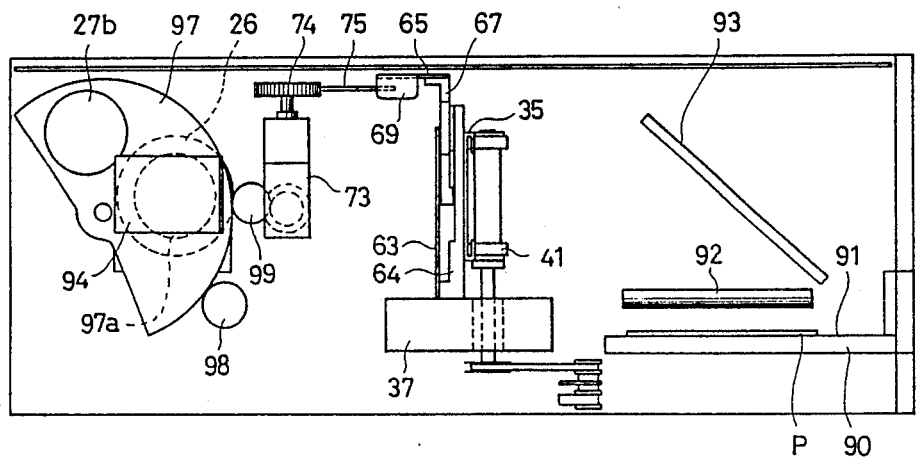

The TV viewer includes a print holding case 90 in addition to the film feeding device 30 and the slide feeding device 60, so that the pictures of prints, film or slides can be selectively shown. These devices are incorporated in the cabinet (casing) 10, as shown in FIG. 19. The viewer has the slide case insertion opening 11, the film insertion opening 12, the ejecting button 13, the power switch 14, the frame reveresing button 15, the frame forwarding button 16, the film and slide framing adjustment handle 17, the levers 18 for switching the vertical and horizontal positions of the imaging element, and the imaging device (image pick-up device) 95 which selectively images the print, the film or the slide, and the monitor TV 19 which shows the images, similarly to the above-mentioned embodiments.

The print holding case 90 has a flat print holding plane 91 and can be retractably inserted, in a horizontal direction, into the cabinet 10 (FIG. 19).

As a light source, two parallel fluorescent lamps 92, 92 are provided above the right and left sides of the print holding case 90 to illuminate the print holding plane 91.

Above the print holding plane 91 an inclined first mirror 93 is provided which reflects the light reflected from the print holding plane 91 rearwardly, in parallel with the print holding plane 91. A second mirror 94 is provided rearwardly of the first mirror 93 to reflect the light from the first mirror so as to be parallel with the print holding plane 91. The light reflected from the second mirror 94 is received by the photographing lens 96 of the imaging device 95.

The photographing lens 96 defines an optical path extending to the print holding plane 91 through the second mirror 94 and the first mirror 93 to form a focused image onto the print P of the print holding plane 91.

The print holding plane 91 is, preferably, made of a white reflecting plate, so that when the print P is located on the print holding plane, the beam reflected by the print P is incident upon the imaging device 95 and when no print is located on the print holding plane 91, the white beam of the image reflected by the print holding plane 91 is incident upon the print holding plane 91. The print holding plane 91 has a print keeper (not shown) which holds the peripheral edge of the print to restrict the position thereof.

The image pick-up device 95 has a focal length adjusting member 97 directly in front of the photographing lens 96. The focal length adjusting member 97 is composed of a rotatable semicircular gear (plate) 97 which has two close-up lenses 97a and 97b attached thereto having different focal lengths. The gear 97 can be automatically rotated by a motor 98 in accordance with the print P, the film F and the slide S in order to carry out focusing of the photographing lens 96, so that the print P, the film F and the slide S can be located at the focus of the photographing lens 96.

In the image pick-up device 95, image pick-up elements (not shown), such as CCD's are provided which receive the focused beam of image past the focal length adjusting member 97, so that the image is fed to the monitor TV 19. The image pick-up elements are rotated by a rotation drive (e.g. motor) 99 to selectively occupy the vertical position or the lateral position.

Images of prints can be viewed by the following operations.

The print holding case 90 is pulled out to put the print P on the print holding plane 91, so that the print is held by the print keeper. After that, the print holding case 90 is inserted in the apparatus, so that a detecting switch (not shown) detects the insertion of the print P and feeds detection signals to the control unit which brings the focal length adjusting member 97 into a position for the print. In the illustrated embodiment, since the print P is located at the focus of the photographing lens 96, no intervention of the close-up lenses is necessary, and, accordingly, the focal length adjusting member 97 only opens the optical path of the photographing lens 96.

The control circuit lights the fluorescent lamps 92 to show the pictures of the print P in the monitor TV 19. When the view of the print ends, the print holding case 90 is pulled out again and the control unit turns the fluorescent lamps 92 and the monitor TV 19 to off.

The optical system of the film feeding mechanism 30 and the slide feeding mechanism 60 will be explained below in detail.

The mechanical constructions of the film feeding mechanism 30 and the slide feeding mechanism 60 are substantially identical to those of the TV viewer shown in FIGS. 1 to 17. The difference resides only in the photographing optical system and in the absence of the parallel glass plate 77.

When the pictures of the film F are monitored, the print holding case 90 which has no print P is inserted in the cabinet 10. Film F is then inserted in the insertion opening 32. The film F is then fed forwardly until the first frame is aligned with aperture 36. In this moment, or prior to insertion, the focal length adjusting member 97 is rotated to bring the close-up lens 97a for the film before the photographing lens 96. As a result, the focal length of the photographing lens 96 is shortened, so that the film F of the film holding plane is positioned at the focal point of the photographing lens 96. The fluorescent lamps 92 light, so that the pictures of the film F which is illuminated by the reflected white image of the print holding plane 91 are shown in the monitor TV 19.

The feeding operation and the framing operation of the film F are same as those of the above-mentioned embodiments.

The slide S is monitored as follows.

The print holding case 90 which has no print P thereon is inserted in the cabinet 10. After that, the slide case 61 which carries the slides S thereon is inserted and set in the slide case insertion opening 11. Then, the frame forwarding button 61 is actuated to load the slides, one by one, in the slide holding plane 53 mentioned above.

In this moment, or prior to the insertion, the focal length adjusting member 97 rotates, so that the close-up lens 97b for the slide comes before the photographing lens 96. As a result, the focus of the photographing lens 96 coincides with the slide S on the slide holding plane 63, so that the pictures of the slides S can be monitored in monitor TV 19.

The feeding operation and the framing operation of the slides S are the same as those of the above-mentioned embodiments.

As can be understood from the foregoing, in the embodiment shown in FIGS. 18 to 21, the pictures of the print, the positive or negative film, and the slides, can be selectively monitored in the monitor TV 19. Loading of film F and the slides S can be automatically and easily effected by the respective feeding mechanisms 30 and 60. Furthermore, the framing operation can be easily effected by the single framing adjusting knob 17 while watching the pictures in the monitor TV 19. It is possible to move the image pick-up device 95 and the photographing lens 96 in order to effect the framing operation.

The horizontal loading arrangement is adopted in the illustrated embodiment in order to make the loading operation of prints P easier. Alternatively, it is also possible to make a vertical loading arrangement in which print P is loaded in the vertical direction in parallel with film F and the slide S. In such vertical loading, since no first mirror 93 in the vicinity of the print holding plane 91 is necessary, no second mirror 94 is also necessary, so that the image pick-up device 95 can be placed perpendicularly to the print holding plane 91, the film and slide holding planes.

It is also possible to provide a pentagonal prism, or two mirrors equivalent thereto, in place of the first mirror 93. In this alternative, the second mirror 94 can be dispensed with, and, accordingly, the image pick-up device 95 can be placed perpendicularly to the print holding plane 91 and the film and slide holding planes.

As can be understood from the above discussion, according to an aspect of the invention, the TV viewer includes the light source and the image pick-up device (imaging device) which is spaced from the light source at a predetermined distance, the film holding plane and the slide holding plane which are spaced from one another in the optical axis direction between the light source and the image pick-up device, the film feeding device which moves the film to the film holding plane, and the slide feeding device which moves the slide to the slide holding plane. The pictures of the film or the slide which can be automatically fed onto the film holding plane or the slide holding plane are output to the monitor TV, so that the enlarged pictures of the slide and the film (whatever the film is) can be shown in the monitor TV.

According to another aspect of the invention, between the image pick-up device and the film and the slide holding planes, and a retractable optical element is provided which makes the optical distance between the film and the image pick-up device identical to that between the slide and the image pick-up device, and, accordingly, once the focus is adjusted, no readjustment of focus is necessary even after the slide is exchanged for the film and vice versa.

According to another aspect of the invention, a TV viewer includes a light source and an the image pick-up device (i.e., an imaging device) which is spaced from the light source by a predetermined distance. A film holding plane is provided between the light source and the image pick-up device, and a film feeding device moves the film to the film holding plane, so that the pictures of the film in the film holding plane can be output to the monitor TV by the image pick-up device. The film is fed by the motor driven rollers which are controlled by the control unit which has detectors for detecting the tail end and the leading end of the film, so that the first frame of the film can be easily and stably brought into the film holding plane. The film can be automatically fed frame by frame.

According to another aspect of the invention, in a TV viewer which includes a print holding plane for holding the print, a light source for illuminating the print holding plane, the film holding plane and the slide holding plane which are provided between the light source and the image pick-up device and which are spaced from one another in the optical axis direction, the image pick-up device receives the light which is reflected from the print on the print holding plane or the light which is reflected from the print holding plane having no print thereon and which is transmitted through the film or the slide to input the images of the print, the film and the slide into the monitor TV. Accordingly the pictures of the film, the print and the slides can be easily shown in the TV monitor. Furthermore, the light source is common to the print, the slide and the film, resulting in the achievement of a compact TV viewer.

According to still another aspect of the invention, a focal length adjusting member of the image pick-up device is additionally provided, so that the print on the print holding plane, the film in the film holding plane, and the slide in the slide holding plane can be located at the focal point of the image pick-up device. The image pick-up device receives the light which is reflected from the print on the print holding plane or the light which is reflected from the print holding plane having no print thereon, and which is transmitted through the film or the slide to input the images of the print, the film and the slide into the monitor TV, in accordance with the focal length of the image pick-up device. Therefore, once the focus of the image pick-up device is adjusted to meet any one of the print, the film and the slide, no readjustment of the focus is necessary even after the exchange of the film, the print and the slide for one another is effected. This is particularly advantageous when two or more kinds of pictures (print, film and slide) need to be shown in the TV monitor.

I claim:

1. A TV viewer comprising a light source and an image pick-up device which is spaced from the light source by a predetermined distance, a film holding plane and a slide holding plane which are spaced from one another along an optical axis direction of the image pick-up device, said planes being located between the light source and the image pick-up device, a film feeding device for feeding film to the film holding plane, and a slide feeding device for feeding at least one slide to the slide holding plane.

2. A TV viewer according to claim 1, further comprising a TV monitor connected to the TV viewer and means for inputting an image of film or of a slide held in the film holding plane or the slide holding plane into the TV monitor.

3. A TV viewer according to claim 1, further comprising means for moving the film holding plane and the slide holding plane in associated planes including the film holding plane and the slide holding plane, to effect framing of the film and the slide, respectively.

4. A TV viewer according to claim 1, further comprising an optical element which is adapted to be inserted in and retracted from the optical path of the image pick-up device between the image pick-up device and the film and slide holding planes in order to make the optical distance between the film holding and the image pick-up device identical to the optical distance between the slide holding plane and the image pick-up device.

5. A TV viewer according to claim 4, wherein said slide holding plane is located closer to the image pick-up device than the film holding plane.

6. A TV viewer according to claim 4, wherein said optical element comprises a flat glass plate.

7. A TV viewer according to claim 6, wherein said flat glass plate is incorporated in said slide feeding device, wherein said optical element can be moved between the film holding plane and the slide holding plane by the slide feeding device when pictures of film are taken by image pick-up device.

8. A TV viewer for print, film and slides comprising a print holding plane for a print, a light source for illuminating the print holding plane, an image pick-up device which receives light reflected from the print holding plane, and a film holding plane and slide holding plane which are spaced from one another along an optical axis direction of the image pick-up device, between the print holding plane and the image pick-up device, said image pick-up device being adapted to receive light which is reflected from a print located on the print holding plane or light which is reflected by the print holding plane having no print thereon and which is adapted to be transmitted through the film or the slide.

9. A TV viewer according to claim 8, wherein said print holding plane is perpendicular to said film and slide holding planes, and wherein said image pick-up device has an optical axis in parallel with said film and slide holding planes, said viewer further comprising two mirrors which are opposed to each other, wherein said film and slide holding planes are located between the mirrors, whereby light reflected by the print holding plane is reflected by said mirrors and is transmitted through said film and slide holding planes into the image pick-up device.

10. A TV viewer according to claim 8, wherein said print holding plane comprises a white reflecting plate.

11. A TV viewer according to claim 8, further comprising means for moving the print holding plane, the film holding plane and the slide holding plane in the associated planes in which the respective holding planes are included to effect framing of a print, a film and a slide, respectively.

12. A TV viewer according to claim 8, further comprising a film feeding device for feeding film to said film holding plane and a slide feeding device for feeding a slide to said slide holding plane.

13. A TV viewer comprising a print holding plane for holding a print, a light source for illuminating the print holding plane, an image pick-up device which is adapted to receive light reflected from the print holding plane, a film holding plane and a slide holding plane which are spaced from one another in the optical axis direction of the image pick-up device, between the print holding plane and the image pick-up device, and a focal length adjusting means for adjusting the focus of the image pick-up device, wherein the focal point of the image pick-up device coincides with one of said print holding plane, film in the film holding plane, or a slide in the slide holding plane, said image pick-up device being adapted to receive light which is reflected from a print located on the print holding plane or light which is reflected by the print holding plane having no print thereon, and which is transmitted through film or a slide, in accordance with the focus of the image pick-up device.

14. A TV viewer according to claim 13, wherein said focal length adjusting means comprises a rotatable plate which has close-up lenses having different focal lengths, and means for selectively moving the close-up lenses onto the optical axis between the image pick-up device and the film and slide holding planes.

15. A TV viewer according to claim 13, wherein said print holding plane is perpendicular to the film and slide holding planes, and wherein said image pick-up device has an optical axis in parallel with the film and slide holding planes, said viewer further comprising two mirrors which are opposed to each other, wherein the film and slide holding planes are located between the mirrors, whereby light reflected by the print holding plane is reflected by the mirrors and is transmitted through the film and slide holding planes into the image pick-up device.

16. A TV viewer according to claim 13, wherein said print holding plane comprises a white reflecting plate.

17. A TV viewer according to claim 13, further comprising means for moving the print holding plane, the film holding plane and the slide holding plane in the associated planes in which the respective holding planes are included to effect framing of the print, the film and the slide, respectively.

18. A TV viewer according to claim 13, further comprising a film feeding device for feeding film to the film holding plane and a slide feeding device for feeding a slide to the slide holding plane.

19. An image viewing device comprising a light source and an image pickup device spaced a fixed distance from said light source and defining an optical path therebetween, a film holding plane and a slide holding plane spaced from one another in the direction of the optical path defined between said light source and said image pickup device, said film holding and slide holding plane being parallel to one another and perpendicular to the direction of the optical path, and means movable into the optical path for causing the optical distance between said film holding plane and said image pickup device to be the same as the distance between said slide holding plane and said image pickup device.

20. An image viewing device in accordance with claim 19 wherein said means movable into the optical path comprises a flat glass plate.

21. An image viewing device in accordance with claim 19 further including slide feeding means for feeding a slide to said slide holding plane and a film feeding device for feeding a film to said film holding plane, said means movable into the optical path is incorporated into one of said slide feeding means or said film feeding means.

22. An image viewing device in accordance with claim 19 wherein said means movable into the optical path comprises an optical element having a predetermined thickness, said thickness defined by the distance between the film plane and the slide plane.

23. A method for selective focus of an image pickup device in an image viewing mechanism comprising positioning an image pickup device at a fixed location within the image viewing mechanism, providing a light source spaced from the image pickup device and defining a light path between said light source and said image pickup device, locating a slide in a plane perpendicularly intercepting said optical path, locating a film in a plane perpendicularly intercepting said optical path and spaced from said slide plane, choosing the focus of said image pickup device as being equal to the distance between the image pickup device and one of said slide plane or said film plane and moving an optical member into the optical path for causing the optical distance between the slide plane and the image pickup device to be identically equal to the distance between the film plane and the image pickup device.

24. A method in accordance with claim 21 wherein moving an optical element comprises moving a flat glass plate into the optical path.

25. A method in accordance with claim 22 further comprising determining the thickness of the flat glass plate in accordance with the distance between slide plane and the film plane.

* * * * *

UNITED STATES PATENT AND TRADEMARK OFFICE
CERTIFICATE OF CORRECTION

PATENT NO. : 4,943,853
DATED : July 24, 1990
INVENTOR(S) : Tahei MORISAWA

It is certified that error appears in the above-indentified patent and that said Letters Patent is hereby corrected as shown below:

At column 13, line 56 (claim 4, line 6), insert ---plane--- after "holding".
At column 14, line 2 (claim 7, line 6), insert ---the--- after "by".
At column 14, line 37 (claim 12, line 3), insert ---,--- after "plane".
At column 15, line 25 (claim 19, line 7), insert ---plane--- before "and".
At column 16, line 29 (claim 24, line 1), change "21" to ---23---.
At column 16, line 32 (claim 25, line 1), change "22" to ---24---.

Signed and Sealed this

Twenty-first Day of March, 1995

Attest:

BRUCE LEHMAN

Attesting Officer

Commissioner of Patents and Trademarks